(12) United States Patent
Girardey et al.

(10) Patent No.: US 8,612,920 B2
(45) Date of Patent: Dec. 17, 2013

(54) FIELD DEVICE FOR DETERMINING OR MONITORING A PHYSICAL OR CHEMICAL VARIABLE

(75) Inventors: Romuald Girardey, Huningue (FR); Michael Hübner, Karlsruhe (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 650 days.

(21) Appl. No.: 12/805,870

(22) Filed: Aug. 23, 2010

(65) Prior Publication Data
US 2011/0054637 A1    Mar. 3, 2011

(30) Foreign Application Priority Data
Aug. 27, 2009    (DE) .......................... 10 2009 028 938

(51) Int. Cl.
*G06F 11/22*    (2006.01)
*G06F 17/50*    (2006.01)

(52) U.S. Cl.
USPC ........... 716/136; 716/106; 716/107; 324/610; 324/648; 324/706; 324/725; 702/182

(58) Field of Classification Search
USPC .......... 716/106, 107, 136; 324/610, 648, 706, 324/725
See application file for complete search history.

(56) References Cited

U.S. PATENT DOCUMENTS

| | | | |
|---|---|---|---|
| 6,765,391 B2 * | 7/2004 | Corkum et al. ............... | 324/610 |
| 2004/0015282 A1 | 1/2004 | Babala et al. | |
| 2007/0152709 A1 | 7/2007 | Gerhart | |
| 2008/0109677 A1 | 5/2008 | Rasmussen | |

FOREIGN PATENT DOCUMENTS

| | | |
|---|---|---|
| DE | 10 2005 034 161 | 10/2006 |
| DE | 102005034161 | 10/2006 |
| DE | 102006007098 | 7/2007 |
| DE | 102007057672 | 6/2009 |
| WO | WO 2008/046694 A1 | 4/2008 |
| WO | WO 2009/062954 A1 | 5/2009 |

OTHER PUBLICATIONS

Ted Huffmire, Brett Brotherton, Gang Wang, Timothy Sherwood, Ryan Kastner, Timothy Levin, Thuy Nguyen, and Cynthia Irvine, "Moats and Drawbridges: An Isolation Primitive for Reconfigurable Hardware Base Systems", 2007.*
Romuald Girardey, Michael Hübner, Jürgen Becker, "Dynamic Reconfigurable Mixed-signal Architecture for Safety Critical Applications", 2009.*
English Translation of IPR.

* cited by examiner

*Primary Examiner* — Vuthe Siek
*Assistant Examiner* — Brian Ngo
(74) *Attorney, Agent, or Firm* — Bacon & Thomas, PLLC

(57) ABSTRACT

A field device, comprising a sensor, and a control/evaluation unit. The control/evaluation unit is implemented on an application-specific integrated circuit—an ASIC—which, in at least a first section and in a second section, is embodied as a dynamically reconfigurable logic chip. In each of the two sections, in each case, a measuring path composed of a plurality of function modules can be configured; wherein the individual sections are spaced apart from one another in such a manner, that a temperature and/or a voltage change in one of the sections has no influence on the other section or the other sections. The control/evaluation unit partially dynamically reconfigures the function modules in the measuring paths as a function of the particular defined safety-critical application, so that the field device fulfills the required safety standard.

19 Claims, 6 Drawing Sheets

Fig. 6

FIELD DEVICE FOR DETERMINING OR MONITORING A PHYSICAL OR CHEMICAL VARIABLE

TECHNICAL FIELD

The invention relates to a field device for determining or monitoring a physical or chemical variable. The field device includes a sensor, which works according to a defined measuring principle, and a control/evaluation unit, which, as a function of a required safety standard for a particular safety-critical application, conditions and evaluates along at least two equivalent measuring paths measurement data delivered by the sensor. Preferably, the field device is employed in automation technology, especially in process and manufacturing automation. It can, however, also be employed for safety-critical applications in the automobile sector, etc.

BACKGROUND DISCUSSION

A corresponding solution from the field of the process automation is already described in WO 2004/013585 A1. In automation technology, especially in process automation technology, field devices are applied, which are used for determining and monitoring process variables. Examples of such field devices are fill level measuring devices, flow measuring devices, analytical measuring devices, pressure and temperature measuring devices, moisture and conductivity measuring devices, density and viscosity measuring devices. The sensors of these field devices register the corresponding process variables, for example fill level, flow, pH-value, substance concentration, pressure, temperature, moisture, conductivity, density or viscosity.

Also subsumed under the term "field devices" are, however, actuators (e.g. valves or pumps), via which, for example, the flow a liquid in a pipeline or the fill level in a container can be changed. A large number of such field devices are available from members of the firm, Endress + Hauser.

In modern automation technology plants, as well as in the automobile sector, field devices are, as a rule, connected via communication networks (such as HART multidrop, point to point connection, Profibus, Foundation Fieldbus, or CAN-bus) with a superordinated unit, which is referred to as a control system or superordinated control unit. This superordinated unit serves to perform control, diagnostic and visualizing functions, and is also used for monitoring, starting up and servicing the field devices. Additional components necessary for operation of fieldbus systems and directly connected to a fieldbus (especially components used for communication with the superordinated units) are likewise frequently referred to as field devices. These supplemental components include, for example, remote I/Os, gateways, linking devices, controllers or wireless adapters.

The software portion of field devices is constantly increasing. The advantage of the use of microcontroller-controlled, intelligent field devices (smart field devices) lies in the fact that a large number of different functionalities can be implemented in a field device via application-specific software programs; program changes can also be performed relatively easily. On the other hand, the high flexibility of program-controlled field devices is countered by a relatively low processing speed—and therewith a correspondingly low measuring rate—as a result of the sequential progression through the program.

In order to increase processing speed, ASICs (Application Specific Integrated Circuits) are always used in these field devices, whenever such makes sense. Through application-specific configuration, these chips can process data and signals substantially faster than a software program can. ASICs are especially excellently suited for computationally intensive applications.

A disadvantage in the application of ASICs is the fact that the functionality of these chips is firmly predetermined. A subsequent change in functionality is not readily possible in the case of these chips. Furthermore, the use of ASICs is only worthwhile in the case of a relatively large number of pieces, since the developmental effort and the therewith connected costs are high.

In order to avoid the drawbacks of the firmly predetermined functionality, in WO 03/098154 A1, a configurable field device is described, in the case of which a reconfigurable logic chip is provided in the form of an FPGA. In this known solution, the logic chip—which has at least one microcontroller, which is also referred to as an embedded controller—is configured during system start. After the configuration is finished, the required software is loaded into the microcontroller. The reconfigurable logic chip required in such case must have at its disposal sufficient resources (particularly logic, wiring and memory resources) in order to fulfill the desired functionalities. Logic chips with many resources require a great deal of energy, which, again, from a functional point of view, makes use thereof in automation possible only to a limited degree. A disadvantage of using logic chips with few resources (and, thus, with a smaller energy consumption) is the considerable limitation in the functionality of the corresponding field device.

Depending on the particular application, the field devices must satisfy a most varied range of safety requirements. In order to satisfy the particular safety requirements (e.g. the SIL-standard "security integrity level", which is important in process automation), the functionality of the field devices must be fashioned in a redundant and/or diverse manner.

Redundance means increased safety through doubled, or plural, design of all safety-relevant hardware and software components. Diversity means that the hardware components (e.g. microprocessors or A/D converters) located in the various measuring paths come from different manufacturers and/or are of different type. In the case of software-components, diversity requires that the software stored in the microprocessors originates from different sources, e.g. comes from different companies, or different programmers, as the case may be. Through all these measures, it should be assured that a safety-critical failure of the field device, as well as the occurrence of simultaneously arising systematic errors in the provision of measured values, are excluded with a high probability. It is also known additionally to design individual essential hardware and software components of the evaluating circuit in redundant and/or diverse manner. Through redundant and diverse design of individual hardware and software components, the degree of safety can further be increased.

An example of a safety-relevant application is fill-level monitoring in a tank in which a burnable or explosive liquid—or also a liquid which is not burnable, but instead presents a hazard to local waters—is stored. Here, it must be assured that the supply of liquid to the tank is immediately interrupted as soon as a maximum reliable fill level is reached. This, in turn, presupposes that the measuring device detects the fill level with a high reliability, and that the measuring device works faultlessly.

In WO 2009/062954 A1, a field device is described, which has a sensor functioning according to a defined measuring principle. Also present is a control/evaluation unit, which, as a function of a safety standard required for the particular safety-critical application, conditions and evaluates along at least two equal-valued measuring paths the measurement data delivered by the sensor. The control/evaluation unit is at least partially embodied as a reconfigurable logic chip having a plurality of partially dynamically reconfigurable function modules. In each case, the control/evaluation unit configures the function modules in the measuring paths as a function of the particular defined safety-critical application, and does so in such a manner, that the field device is designed according to the required safety standard.

Problematic in the case of the known embodiment is the fact that a malfunction (e.g. a short circuit or a temperature change) in one section automatically influences other sections. A crosstalk onto other sections takes place, meaning that the field device could deliver defective measurement results, and thus no longer works reliably. This presents a high risk in safety-critical applications, a situation which is not acceptable.

SUMMARY OF THE INVENTION

An object of the invention is to provide a highly flexible field device for safety-critical applications.

The object is achieved by the features that the control/evaluation unit is built upon an application-specific integrated circuit—an ASIC—which, in at least a first section and in a second section, is embodied as a configurable logic chip, wherein each of the two sections has its own configurable measuring path composed of a plurality of function modules; wherein the individual sections are spaced apart from one another in such a manner, that a temperature change and/or a voltage change in one of the sections has no influence on the other section (or the other sections); and wherein the control/evaluation unit partially dynamically reconfigures the function modules in the measuring paths as a function of the particular defined safety-critical application in such a manner that the field device is designed corresponding to the required safety standard. The distance between two neighboring sections is dimensioned in such a manner, that a malfunction in one section brought about by a short circuit or a sudden temperature change has no effects on, or causes no crosstalk to, the neighboring section/sections.

In an advantageous embodiment of the field device of the invention, the distance between two neighboring sections, or two measuring paths, is dependent on the particular application, for which the control/evaluation unit is put to use. The term, "application", refers in this connection, for example, to the level of the supply voltage of the individual sections.

In this connection, it is additionally or alternatively provided, that the distance between two neighboring sections amounts to several times the size of the structural elements (channel length of the transistors), from which the application-specific integrated circuit (ASIC) is constructed.

Furthermore, a preferred embodiment of the field device of the invention provides that a potential ring is arranged around each section. Preferably, this potential ring is implemented by a corresponding structuring of the ASIC. In this way, a crosstalk of one section on a neighboring section is, in the case of a malfunction, likewise prevented.

According to a preferred embodiment of the field device of the invention, it is furthermore provided that each section has a separate energy supply.

In order to achieve the desired high flexibility, the measuring paths with the dynamically reconfigurable function modules are redundantly, diversely, or redundantly and diversely designed or designable. In individual cases, the embodiment complies with the applicable safety standard, e.g. SIL1, SIL2, SIL3. The safety standard requires, for example, a redundant and diverse design for the hardware and software components. This means that redundant components from different manufacturers are drawn upon, whereby systematic malfunctions of the components can, with a high probability, be excluded. In the case of software, "diverse" means that the programs are created by different programming firms and/or different programmers. Through this, elimination of systematic errors should, with near certainty, also be achieved.

Further associated with the control/evaluation unit is a voter, e.g. in the form of a microcontroller, which compares the data, which are made available from or in the measuring paths and which correspond to one another other, with one another, and, in the case of a deviation, generates a warning or error report.

In particular, the control/evaluation unit serially or parallelly reconfigures the function modules for an uneven number of redundant and/or diverse measuring paths in a partially dynamic manner, wherein the control/evaluation unit compares the data made available from or in the measuring paths with one another, and generates a warning report, which states that a defined measuring path is delivering defective data, when data, which deviate from the data of the remaining measuring paths are made available on the defined measuring path.

Moreover, it is provided that the control/evaluation unit redundantly and/or diversely reconfigures the individual function modules or groups of function modules in the individual sections, wherein the voter or the microcontroller, through comparison of the data of individual function modules or groups of function modules with corresponding redundant or diverse function modules or groups of function modules, ascertains whether the function module or the group of function modules in the corresponding section works correctly, or is malfunctioning. It is furthermore provided that, in the case of an ascertained error, the control/evaluation unit newly reconfigures the defective function module or the defective group of function modules in the section, and compares the corresponding data with one another.

In the case of a renewed occurrence of an error, the control/evaluation unit once again loads a diverse function module or group of diverse function modules in a corresponding section of the logic chip.

If the error subsequently still occurs, the control/evaluation unit then blocks the corresponding section of the logic chip, reconfigures the corresponding function module or the corresponding group of function modules of the measuring path in another region of the corresponding section, and compares the corresponding data with one another.

Furthermore, in the case of a repeated occurrence of an error, the control/evaluation unit produces a report stating that the function module, the group of function modules or the measuring path is malfunctioning. Moreover, the control/evaluation unit reconfigures a redundant and/or diverse function module in the other region. More information concerning this can be found in DE 10 2006 047 262 A1.

An advantageous embodiment of the field device of the invention provides that the control/evaluation unit reconfigures hardware and/or software-based function modules and/or analog function modules in each of the measuring paths.

In a preferred embodiment of the field device of the invention, associated with the sensor is an analog sensor circuit for output of a raw measurement signal, which represents the process variable which is to be determined or monitored; in detail, the following control-evaluation unit includes the following function modules: 1) An analog/digital converter, which converts the analog, raw measurement signal into a digital, raw measurement signal, 2) a processing unit, which serves redundantly and/or diversely to evaluate the digital, raw measurement signal; and, in given cases, 3) a communication circuit, which serves to forward the evaluated measurement signal to a superordinated control unit.

It is moreover provided that the raw measurement signal is additionally supplied to the voter or to the microcontroller, and that, on the basis of a comparison of the actual data of the raw measurement signal with correspondingly stored, desired data, it is determined whether the sensor is working correctly or is malfunctioning.

Preferably, on a selected region of one of the logic chips, a static region is provided, in which at least one function module—e.g. a control unit, in which the control program for configuring the function modules runs—is permanently configured.

It is viewed as especially advantageous when the sections of the logic chip in each case behave as dynamically partially reconfigurable FPGAs or dynamically partially reconfigurable FPAAs. In this way, a higher degree of diversity is achieved. Further details concerning the partially dynamically reconfigurable FPGA can be found in DE 10 2006 049 509 A1, which is incorporated herein by reference.

Preferably, the sections have a standard ASIC structure with logic cells, wherein the logic cells, by means of configuration registers, are configurable in such a way, that they execute basic logic functions,
wherein a connection matrix with a plurality of memory locations is provided, via which various logical connections of the logic cells are configurable in defined complex connections by means of the configuration registers, and wherein a control unit is provided, which, via an internal bus and via the configuration registers and by means of a configuration-bit stream, partially dynamically configures the logic cells and the connection matrix in such a way, that the ASIC structure functionally behaves in the sections as a partially dynamically reconfigurable, standard logic chip. Preferably, at least one section is embodied as a dynamically partially reconfigurable FPAA or as an analog array.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
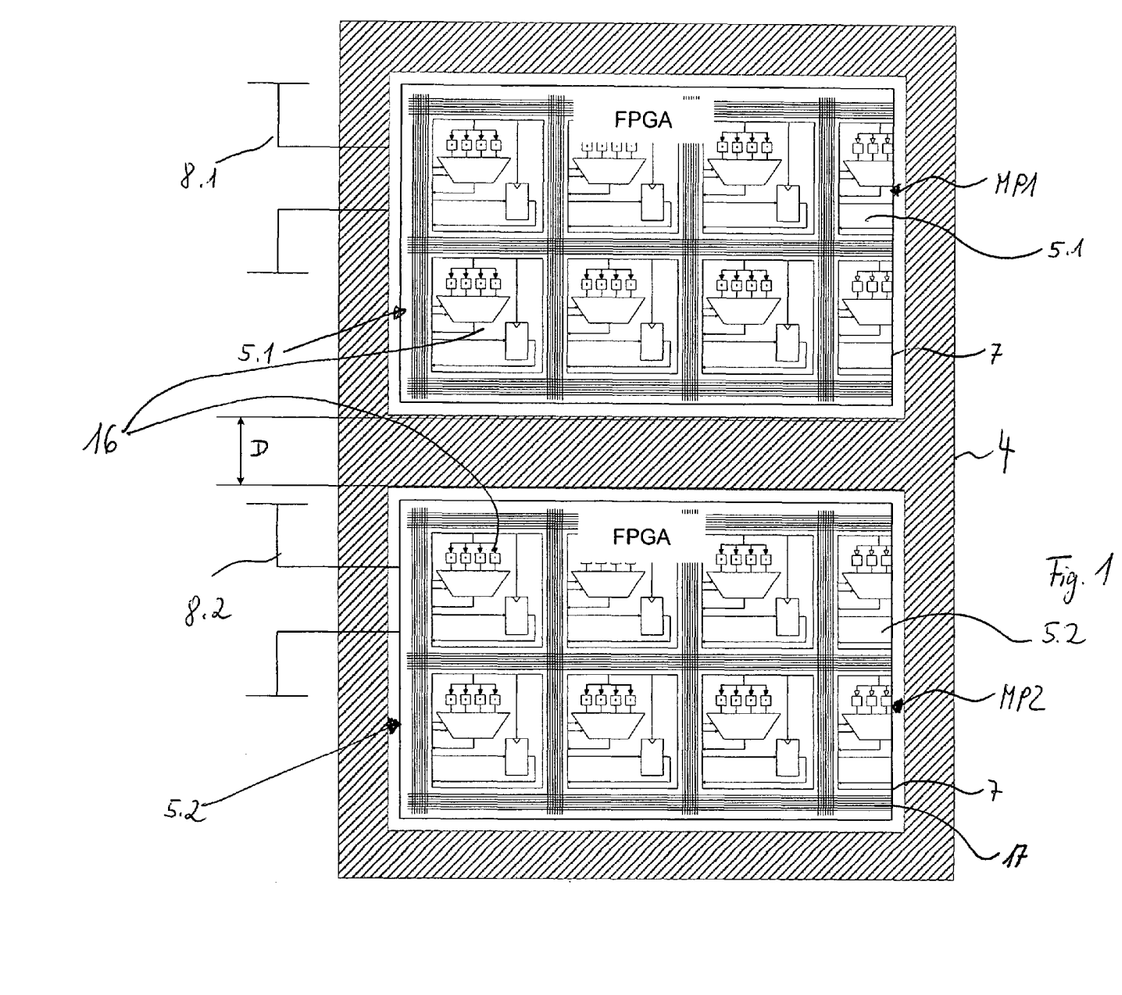
FIG. 1 is a schematic representation of a field device 1 of the invention with two measuring paths.

FIG. 1 shows a schematic representation of the field device of the invention 1 having two measuring paths MP1, MP2 in two sections 5.1, 5.2. The two measuring paths MP1, MP2 are implemented on an ASIC 4, which, in the two sections 5.1, 5.2, is embodied as a dynamically partially reconfigurable logic chip 13. Each measuring path 5.1, 5.2 is composed of a plurality of function modules 6.1, 6.2, . . . , which are not separately represented in the FIG. 1. The two measuring paths MP1, MP2 are—depending on the required safety standard—redundantly and/or diversely designed. The individual function modules 6.1, 6.2 are dynamically partially reconfigured in the measuring paths MP1, MP2. Shown in FIG. 1-FIG. 5, by way of example, are the logic cells 16, from which the logic chip 13 is composed.

In order to avoid that a malfunction in a section 5.1 has an influence on another section 5.2, the two measuring paths MP1, MP2 are spaced apart from one another. The distance between the two measuring paths MP1, MP2, or between the two sections 5.1, 5.2, is signified with D. The distance D between two neighboring sections 5.1, 5.2 is usually dependent on the particular application for which the control/evaluation unit 4 is put to use. An important variable in this connection is the level of the supply voltage in the individual sections 5.1, 5.2. It is furthermore beneficial when the distance D between two neighboring sections 5.1, 5.2 amounts to several times the size of the structural elements, from which the application-specific integrated circuit (e.g the ASIC 4) is constructed. Via these specifications can also be defined the optimal distance D, which two adjoining sections 5.1, 5.2 must have from one another, in order that the occurrence of a malfunction in a section 5.1, or in a measuring path MP1, does not influence the other section 5.2, or the other measuring path MP2. Preferably, the optimal distance D is experimentally ascertained beforehand, taking into account the design of the circuitry. In order to detect whether a temperature change occurs, it is advantageous to have a temperature measurement implemented in each measuring path MP1, MP2.

Arranged around each section 5.1, 5.2 is a potential ring 7, so that overvoltages occurring in a section 5.1, 5.2 are dissipated to ground. Preferably, the potential ring 7 is implemented by a corresponding structuring of the ASIC 4 during manufacture. Through the potential ring 7, likewise crosstalk from a section 5.1 to a neighboring section 5.2 is prevented in the case of occurrence of a malfunction.

In the case of the embodiment illustrated in FIG. 1, each section 5.1, 5.2, or each measuring path MP1, MP2, has its own energy supply 8.1, 8.2.

Figure 2:
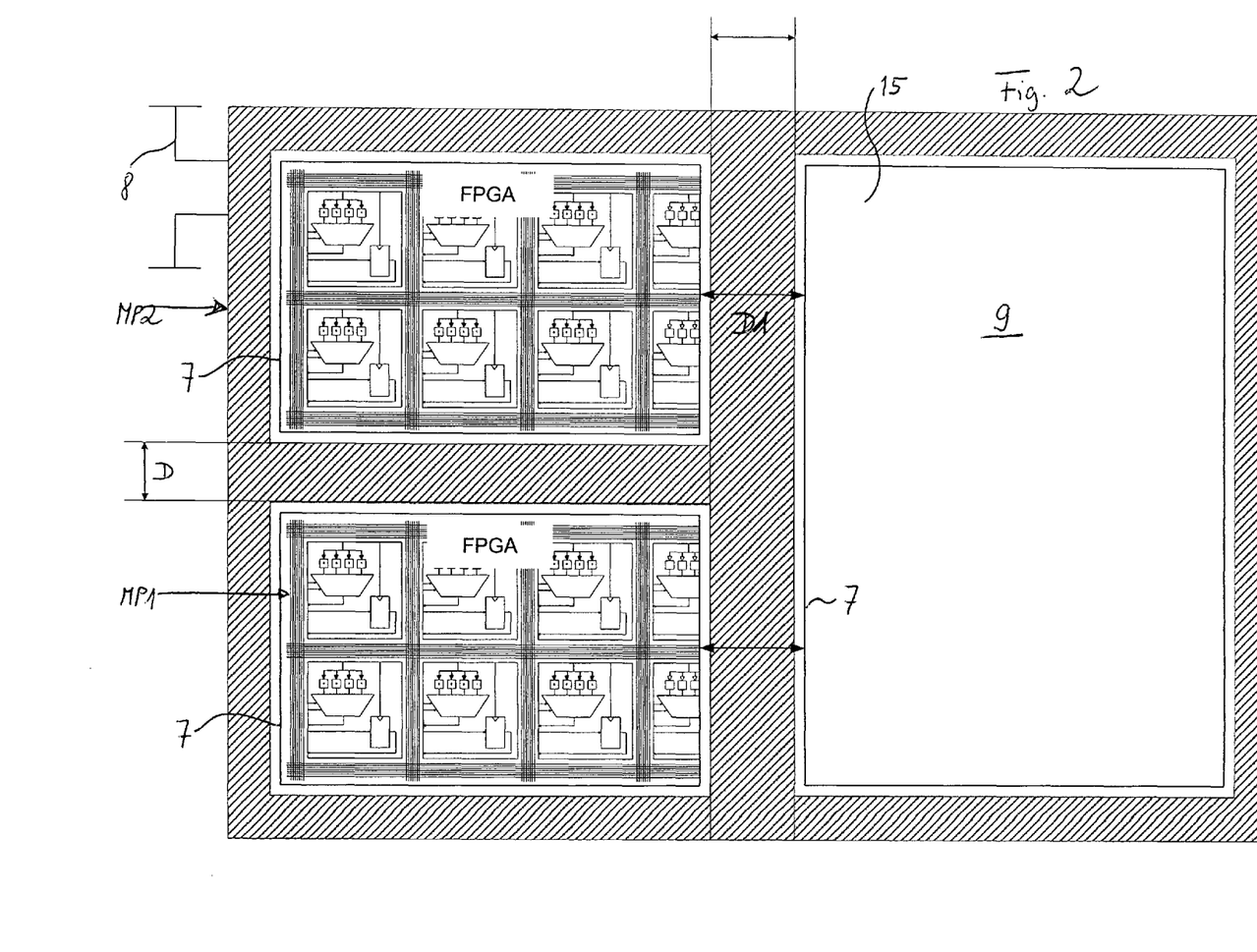
FIG. 2 is a schematic representation of a second embodiment of the field device of the invention with two measuring paths and a voter.

FIG. 2 shows a schematic representation of a second embodiment of the field device 1 of the invention having two measuring paths MP1, MP2. Additionally, provided on the logic chip 13 is a static region 15, in which a voter 9, or microcontroller, is permanently configured. The measuring paths MP1, MP2 and the voter 9 have a shared energy supply 8.

Figure 3:
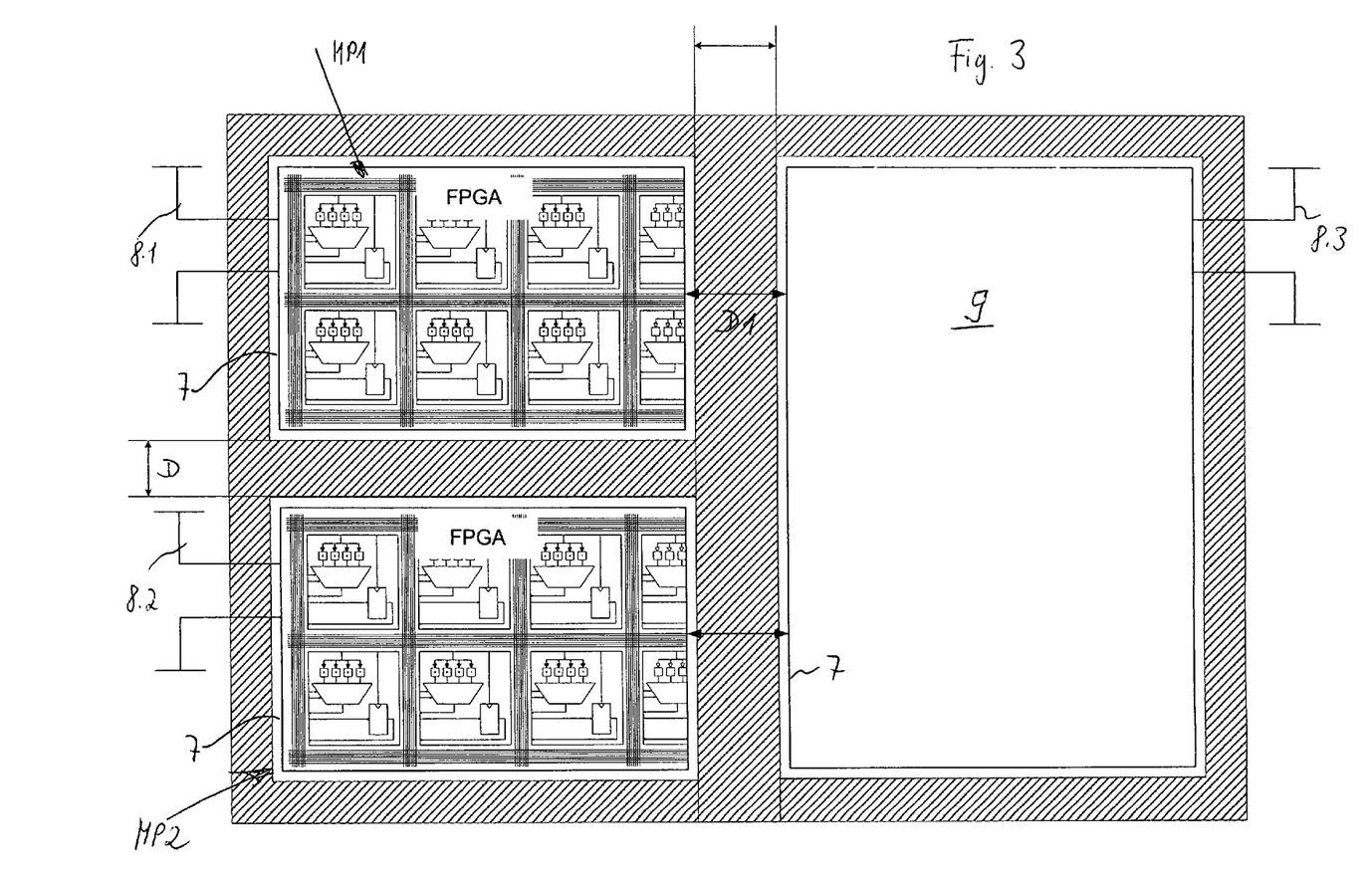
FIG. 3 is a schematic representation of a third embodiment of the field device of the invention, wherein the measuring paths and the voter have, in each case, separate energy supplies.

The embodiment shown in FIG. 3 differs from the embodiment illustrated in FIG. 2 in that the two sections 5.1, 5.2 and the voter 9 have separate energy supplies 8.1, 8.2, 8.3.

Figure 4:
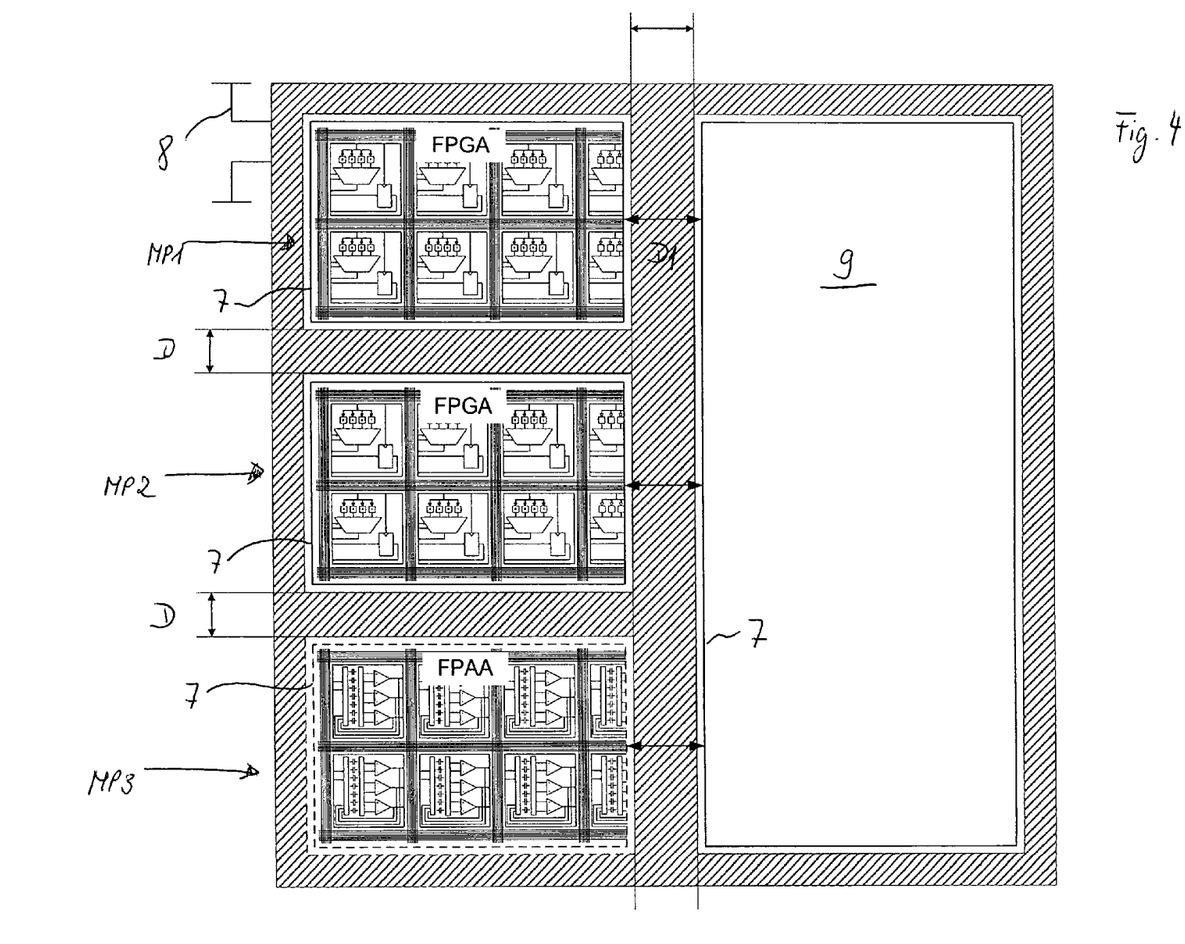
FIG. 4 is a schematic representation of a fourth embodiment of the field device of the invention with three measuring paths and a voter.

The schematic representation of an additional embodiment of the field device 1 of the invention shown in FIG. 4 differs from the embodiment illustrated in FIG. 2 in that three measuring paths MP1, MP2, MP3 are implemented in three sections 5.1, 5.2, 5.3 of the logic chip 13. Thus, this embodiment is distinguished by a triple redundancy and/or diversity, and is suitable for applications with higher safety requirements.

Figure 5:
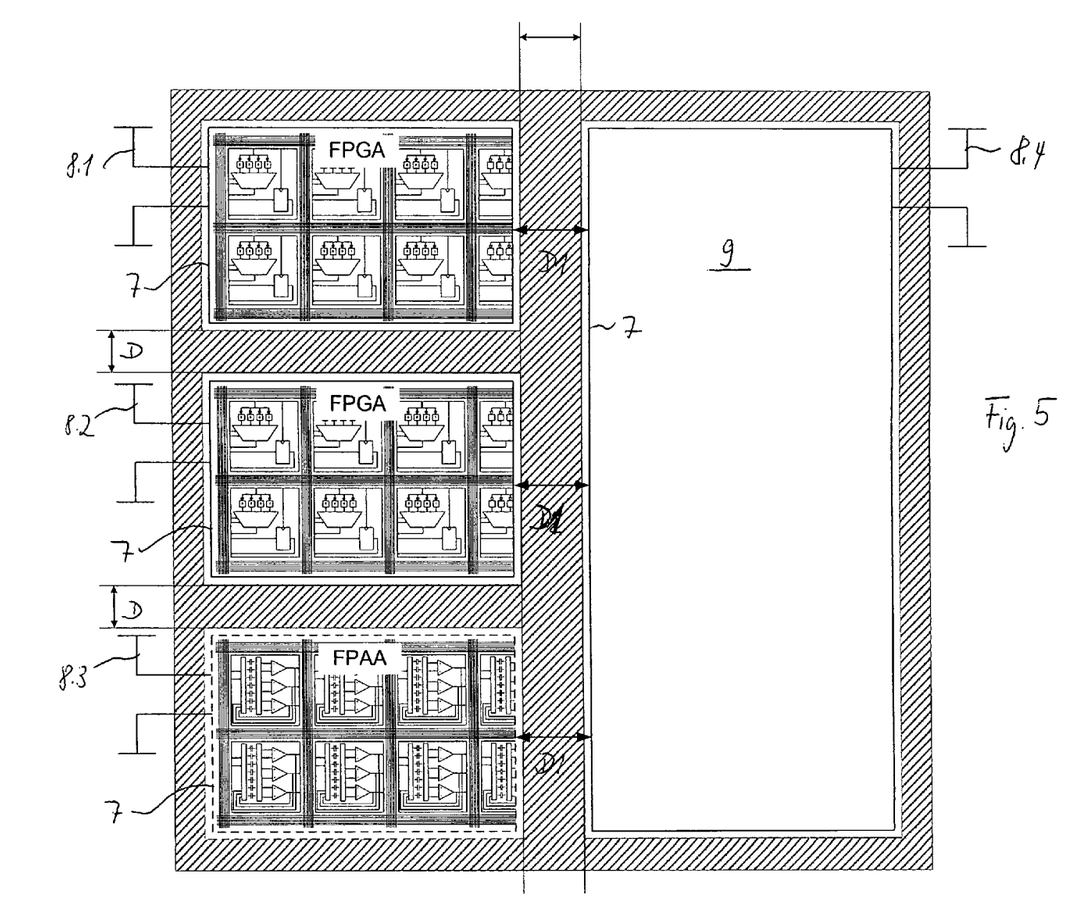
FIG. 5 is a schematic representation of a fifth embodiment of the field device of the invention, wherein the three measuring paths and the voter have, in each case, separate energy supplies.

The solution shown in FIG. 5 differs from the embodiment illustrated in FIG. 3 in that three measuring paths MP1, MP2, MP3 are implemented instead of two measuring paths MP1, MP2. Any two measuring paths MP1, MP2 of the measuring paths are implemented as redundant and/or diverse FPGAs, while the remaining measuring path MP3 is implemented as an FPAA.

Figure 6:
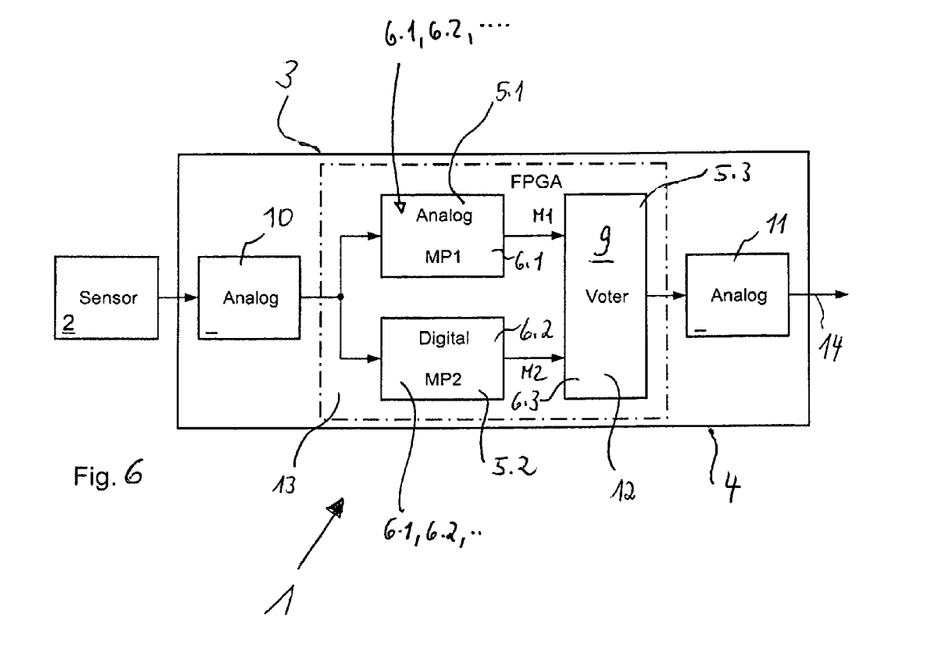
FIG. 6 is a schematic representation of the individual components of an advantageous embodiment of the field device of the invention with two diverse, analogly/digitally embodied measuring paths.

FIG. 6 shows the individual components 6.1, 6.2, ... of the field device 1 of the invention with two diverse, analogly/digitally embodied measuring paths MP1, MP2 for safety-critical applications. Other embodiments with three or five measuring paths are stated in WO 2009/062954 A1 of the assignee. These embodiments, as well as the corresponding advantages thereof, are incorporated here by reference in the present patent application.

Connected with the sensor 2 (which measures and/or monitors any desired physical or chemical variable) is the control/evaluation unit 3. Control/evaluation unit 3 is, at least partly in the region of the logic chip 13 on the ASIC 4, partially dynamically configurable in such a manner as is suitable for the particular application. In addition to the measuring paths MP1, MP2, the analog sensor electronics 10 and the analog communication electronics 11 are also provided on the ASIC 4, corresponding to the particular application. In this connection, "application" means both the type of measuring principle (e.g. travel-time measurement with radar devices, flow measurement with magneto inductive measuring devices), or, also, the use of travel-time measurement for fill level or flow measurement. If a deviation occurs between the measurement results M1, M2 in the different measuring paths MP1, MP2, this is then output (via the data line 14, which preferably involves a data bus) as a warning or error report to a control room (not separately shown), and/or to the operating personnel.

The invention claimed is:

1. A field device for determining or monitoring a physical or chemical variable, comprising:
   a sensor, which works according to a defined measuring principle; and
   a control/evaluation unit, which, as a function of a required safety standard for a particular safety-critical application, conditions and evaluates along at least two equivalent measuring paths measurement data delivered by said sensor, wherein:
   said control/evaluation unit is implemented on an application-specific integrated circuit—an ASIC—which, in at least a first section and in a second section, is embodied as a dynamically reconfigurable logic chip;
   in each of the two sections, in each case, a measuring path, which is composed of a plurality of function modules, can be configured;
   the individual sections are spaced apart from one another in such a manner, that a temperature and/or a voltage change in one of the sections has no influence on any other section;
   said control/evaluation unit partially dynamically reconfigures the function modules in the measuring paths as a function of the particular, defined; and
   the distance between two neighboring sections is greater than the channel length of transistors or size of structural elements, from which the application-specific integrated circuit, the ASIC, is constructed.

2. The field device as claimed in claim 1, wherein:
the distance between two neighboring sections is dependent on a particular application, for which said control/evaluation unit is put to use.

3. The field device as claimed in claim 1, wherein:
each section of said application-specific integrated circuit is surrounded by a potential ring.

4. The field device as claimed in claim 1, wherein:
each section of said application specific integrated circuit has a separate energy supply.

5. The field device as claimed in claim 1, wherein:
said measuring paths are designed redundantly, diversely or redundantly and diversely with respect to the dynamically reconfigurable function modules.

6. The field device as claimed in claim 1, wherein:
associated with said control/evaluation unit is a voter, or a microcontroller, which compares data, which are provided from or in said measuring paths and which correspond to one another, with one another, and, in the case of a deviation, generates a warning or error report.

7. The field device as claimed in claim 1, wherein:
said control/evaluation unit serially or parallelly partially dynamically reconfigures said function modules for an uneven number of redundant and/or diverse measuring paths;
said control/evaluation unit compares data provided by or in said measuring paths with one another; and
said control/evaluation unit generates a warning report stating that a defined measuring path delivers defective data, when data are provided on the defined measuring path, which deviate from data of the remaining measuring paths.

8. The field device as claimed in claim 6, wherein:
said control/evaluation unit redundantly and/or diversely reconfigures said individual function modules or a group of function modules in said individual sections, and
said voter, or the microcontroller, through comparison of data of individual function modules or groups of function modules with corresponding redundant or diverse function modules or groups of function modules, ascertains whether the function module or the group of function modules in the corresponding section is working correctly or is malfunctioning.

9. The field device as claimed in claim 8, wherein:
in the case of an ascertained error, said control/evaluation unit newly reconfigures the defective function module or the defective group of function modules in the section and compares the corresponding data with one another.

10. The field device as claimed in claim 9, wherein:
in the case of yet another occurrence of an error, said control/evaluation unit loads a diverse function module or a group of diverse function modules into the corresponding section of said application specific integration circuit.

11. The field device as claimed in claim 10, wherein:
in the case of a repeated occurrence of an error, said control/evaluation unit blocks the corresponding section of said application specific integration circuit, and reconfigures the corresponding function module or the corresponding group of function modules in another section, and compares the corresponding data with one another.

12. The field device as claimed in claim 11, wherein:
in the case the repeated occurrence of an error, said control/evaluation unit outputs a report stating that the function module or the group of function modules is malfunctioning; and said control/evaluation unit reconfigures a redundant and/or diverse function module in the other section.

13. The field device as claimed in claim 1, wherein:
said control/evaluation unit reconfigures in each of said measuring paths hardware and/or software-based function modules and/or analog function modules.

14. The field device as claimed in claim 6, wherein:
associated with said sensor is an analog sensor circuit for output of a raw measurement signal, which represents a process variable to be determined or to be monitored; and
said subsequent control/evaluation unit has function modules as follows:
an analog/digital converter, which converts analog raw measurement signal to a digital, raw measurement signal;
a processing unit, which serves redundantly and/or diversely to evaluate the digital, raw measurement signal; and
in given cases, a communication circuit, which serves to forward the evaluated measurement signal to a superordinated control unit.

15. The field device as claimed in claim 14, wherein:
the raw measurement signal is furthermore supplied to said voter, or to the microcontroller; and
on the basis of a comparison of actual data of the raw measurement signal with corresponding stored, desired data, it is ascertained whether said sensor is working correctly or is malfunctioning.

16. The field device as claimed in claim 1, wherein:
on a selected region of said logic chip, a static region is provided, in which at least one function module, e.g. a control unit, in which a control program for configuring the function modules runs, is permanently configured.

17. The field device as claimed in claim 1, wherein:
the sections of said logic chip behave as a dynamically partially reconfigurable FPGA, or as a dynamically partially reconfigurable FPAA.

18. The field device as claimed in claim 1, wherein:
the sections have a standard application specific integrated circuit with logic cells;
said logic cells are so configurable by means of configuration registers that they execute basic logic functions;
a connection matrix with a plurality of memory locations is provided, via which various logical connections of said logic cells are, by means of the configuration registers, configurable in defined complex connections; and
a second control unit is provided, which, via an internal bus and via the configuration registers and by means of a configuration-bit stream, partially dynamically configures said logic cells and the connection matrix in such a way, that, in the sections, said application specific integrated circuit functionally behaves as a partially dynamically reconfigurable, standard logic chip.

19. The field device as claimed in claim 18, wherein:
at least one section is embodied as a dynamically partially reconfigurable FPAA or as an analog array.

* * * * *